US011122024B2

(12) United States Patent
Vaughn et al.

(10) Patent No.: US 11,122,024 B2
(45) Date of Patent: Sep. 14, 2021

(54) CHAT SESSION DYNAMIC SECURITY

(71) Applicant: International Business Machines Corporation, Armonk, NY (US)

(72) Inventors: Garfield Vaughn, South Windsor, CT (US); Gandhi Sivakumar, Bentleigh (AU); Vasanthi M. Gopal, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 330 days.

(21) Appl. No.: 16/203,199

(22) Filed: Nov. 28, 2018

(65) Prior Publication Data

US 2020/0169543 A1 May 28, 2020

(51) Int. Cl.
| | |
|---|---|
| *H04N 21/4788* | (2011.01) |
| *H04L 29/06* | (2006.01) |
| *H04L 12/58* | (2006.01) |
| *H04L 29/08* | (2006.01) |
| *G06F 40/30* | (2020.01) |

(52) U.S. Cl.
CPC .............. *H04L 63/08* (2013.01); *G06F 40/30* (2020.01); *H04L 51/04* (2013.01); *H04L 51/16* (2013.01); *H04L 67/145* (2013.01); *H04L 2463/081* (2013.01); *H04N 21/4788* (2013.01)

(58) Field of Classification Search
CPC ........................... H04N 21/4788; G06N 20/00
See application file for complete search history.

(56) References Cited

U.S. PATENT DOCUMENTS

| | | | |
|---|---|---|---|
| 7,284,202 B1 * | 10/2007 | Zenith | G06Q 10/10 715/744 |
| 9,559,993 B2 | 1/2017 | Palakovich et al. | |
| 2014/0237057 A1 * | 8/2014 | Khodorenko | H04L 51/32 709/206 |
| 2016/0134568 A1 | 5/2016 | Woo et al. | |
| 2016/0308799 A1 | 10/2016 | Schubert et al. | |
| 2019/0052616 A1 * | 2/2019 | Campbell | H04L 67/306 |

(Continued)

OTHER PUBLICATIONS

CX Company, "Automating the customer experience"; https://www.cxcompany.com/app/upload/2017/cxcompanywhitepaper.pdf.; 2017.

(Continued)

*Primary Examiner* — Michael H Hong
(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: obtaining chat session data of a chat session having a first participant provided by a patron user and a second participant provided by an enterprise user; detecting, subsequent to a connectivity failure, that a network connection supporting the chat session has been restored; presenting in response to the detecting a prompt to the first participant, the prompt being in dependence on the chat session data; deciding an authentication action in dependence on a received response of the first participant in response to the presented prompt; and performing the authentication action in accordance with the deciding.

20 Claims, 8 Drawing Sheets

(56) References Cited

U.S. PATENT DOCUMENTS

2019/0306252 A1* 10/2019 Lebedev ............ H04L 12/1827

OTHER PUBLICATIONS

Accenture; "Dynamic Digital Consumers—Even Changing Expectations and Technology Intrigue"; https://www.accenture.com; Insights from the 2017 Accenture Digital Consumer Survey; 2017.

Anonymously; "Secure chat delegation to alternative location"; http://ip.com/IPCOM/000206739D; May 5, 2011.

Anonymously; "System and method to cognitively organize meetings from multi-person chats"; http://ip.com/IPCOM/000250469D; Jul. 24, 2017.

Anonymously; "Method and System of Marking IM Messages and Chatlogs Confidential"; http://ip.com/IPCOM/000210970D; Sep. 19, 2011.

* cited by examiner

CHAT SESSION DYNAMIC SECURITY

TECHNICAL FIELD

The invention relates to data security in general and in particular to an artificial intelligence (AI) enhanced data security implementation in a messaging system computing environment.

BACKGROUND

Authentication refers to the act of confirming the truth of an attribute of a piece of data. Authentication can include confirming an identify of a person. Messaging systems have been used for the transmission of messages between parties. Messaging systems can provide real time text transmissions of the Internet. Advanced messaging systems can provide e.g. file transfer, hyperlinks and Voice over IP (VOIP).

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: obtaining chat session data of a chat session having a first participant provided by a patron user and a second participant provided by an enterprise user; detecting, subsequent to a connectivity failure, that a network connection supporting the chat session has been restored; presenting in response to the detecting a prompt to the first participant, the prompt being in dependence on the chat session data; deciding an authentication action in dependence on a received response of the first participant in response to the presented prompt; and performing the authentication action in accordance with the deciding.

In another aspect, a computer program product can be provided. The computer program product can include a computer readable storage medium readable by one or more processing circuit and storing instructions for execution by one or more processor for performing a method. The method can include, for example: obtaining chat session data of a chat session having a first participant provided by a patron user and a second participant provided by an enterprise user; detecting, subsequent to a connectivity failure, that a network connection supporting the chat session has been restored; presenting in response to the detecting a prompt to the first participant, the prompt being in dependence on the chat session data; deciding an authentication action in dependence on a received response of the first participant in response to the presented prompt; and performing the authentication action in accordance with the deciding.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining chat session data of a chat session having a first participant provided by a patron user and a second participant provided by an enterprise user; detecting, subsequent to a connectivity failure, that a network connection supporting the chat session has been restored; presenting in response to the detecting a prompt to the first participant, the prompt being in dependence on the chat session data; deciding an authentication action in dependence on a received response of the first participant in response to the presented prompt; and performing the authentication action in accordance with the deciding.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
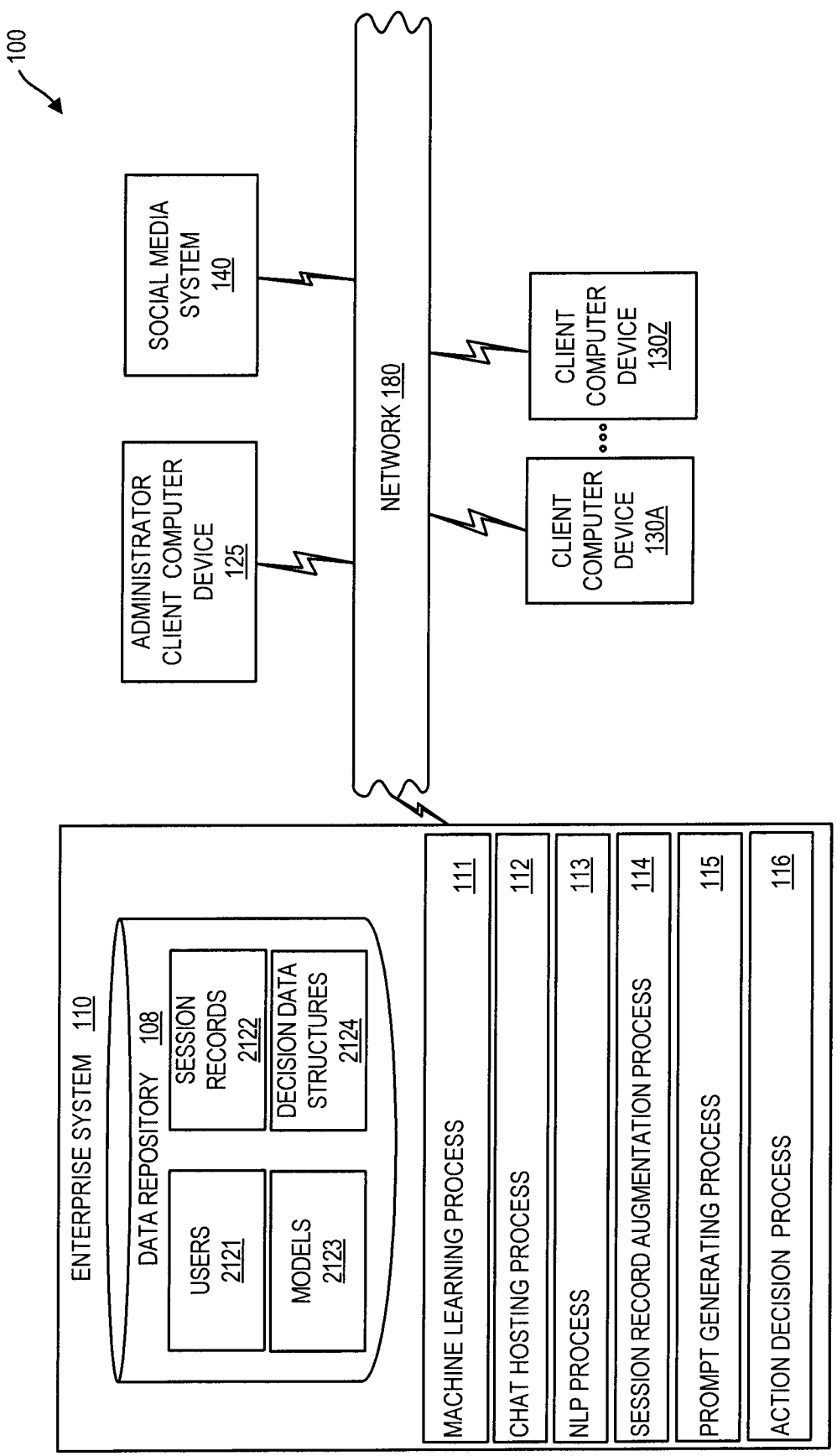
FIG. 1 depicts a system having an enterprise system of client computer devices an administrator client computer device and a social media system according to one embodiment.

System 100 for use in authenticating users in a chat session is shown in FIG. 1. System 100 can include enterprise system 110 having an associated data repository 108, administrator client computer device 125, client computer devices 130A-130Z, and social media system 140. Enterprise system 110, administrator client computer device 125, client computer devices 130A-130Z, and social media system 140 can be in communication with one another via network 180. System 100 can include numerous devices, which may be computing node based devices connected by network 180. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, enterprise system 110 can be external to administrator client computer device 125, client computer devices 130A-130Z, and social media system 140. According to one embodiment, enterprise system 110 can be collocated with one or more of administrator client computer device 125, client computer devices 130A-130Z, and social media system 140.

Embodiments herein recognize that chat sessions in which a user is authenticated can have associated network connections that are lost for various reasons, e.g. the changing location of a user, network strength, changing conditions of a network, and the like. Embodiments herein can use content of a chat session occurring prior to loss of connectivity in order to authenticate a user to an enterprise system supporting a chat session. According to one embodiment, enterprise system 110 can subject content of a chat session to natural language processing (NLP) in order to return topics associated to a chat session in dependence on returned one or more topic, and enterprise system 110 can generate prompts, e.g. in the form of security questions to a user. In dependence on a response to the prompt, enterprise system 110 can return an action decision in the form of an authentication action decision. The returned authentication action decision can be a positive authentication action decision or a negative authentication action decision. A positive authentication action decision can e.g. authenticate a participant or add to an authentication score of the participant making the authentication of the participant more likely. A negative authentication decision can e.g. decline authentication of the participant or reduce an authentication score associated to a participant making authentication less likely.

In one embodiment, each client computer devices 130A-130Z can be associated to a certain user. Regarding client computer devices 130A-130Z, a computer device of client computer devices 130A-130Z according to one embodiment can be a computing node based device provided by a client computer, e.g. a mobile device, e.g. a smartphone, tablet, laptop, smartwatch, or PC that runs one or more program, e.g. including a web browser for opening and viewing webpages e.g. for display of a graphical user interface (GUI). Administrator client computer devices 125 can be a computing node based device provided by a client computer, e.g. a mobile device, e.g. a smartphone, tablet, laptop, smartwatch, or PC that runs one or more program, e.g. including a web browser for opening and viewing webpages e.g. for display of a graphical user interface (GUI).

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Enterprise system 110 can include a messaging system in one embodiment. During a process of registration wherein a user of system 100 registers as a registered user of system 100, a user sending registration data can send with permission data defining the registration data a permission that grants access by enterprise system 110 to data of the user within social media system 140. On being registered, enterprise system 110 can examine data of social media system 140 e.g. to determine whether first and second users are in communication with one another via a messaging system of social media system 140. A user can enter registration data using a user interface displayed on a client computer device of client computer devices 130-130Z. Entered registration data can include e.g. name, address, social media account information, other contact information, biographical information, background information, preferences information, and/or permissions data e.g. can include permissions data allowing enterprise system 110 to query data of a social media account of a user provided by social media system 140 including messaging system data and any other data of the user. When a user opts-in to register into system 100 and grants system 100 permission to access data of social media system 140, system 100 can inform the user as to what data is collected and why, that any collected personal data may be encrypted, that the user can opt out at any time, and that if the user opts out, any personal data of the user is deleted.

Data repository 108 can store various data. In users area 2121 data repository 108 can store data of users of system 100. According to one embodiment, enterprise system 110 can be operated by an enterprise that provides services, e.g. retail services, phone services, television service, Internet services, hospitality services, and the like. Enterprise system 110 according to one embodiment can host chat sessions for providing customer support. The participant of a such a chat session can include users who are human users associated to respective computer devices of client computer devices 130A-130Z. Participants of such chat sessions for patron support can include participants of an enterprise. Participants of an enterprise can include a virtual assistant (VA) or an administrator user associated to administrator client computer device 125 who is a human user.

Data repository 108 in users area 2121 can store data on users of respective client computer devices 130A-130Z, which users can be patrons of an enterprise associated to enterprise system 110. Data in users area 2121 can include, e.g. a user identifiers such as a customer account number. User data of users area 2121 can also include various authentication data, which data can include in addition to a customer account number, e.g. a password and various security questions, e.g. "What is your mother's maiden name?", "What city were you born in?", etc. User data of users area 2121 can also include such data as preferences of users which enterprise system 110 can determine by querying data of social media system 140 based on a permission grant by a user.

Data repository 108 in session records area 2122 can include data on a chat session. Data repository 108 in session records area 2122 can store data on chat sessions and in one embodiment can store historical data specifying all text based content associated to all historical chat sessions. Data repository 108 in session records area 2122 can store all text based data of all chat sessions historically mediated by enterprise system 110 including chat sessions that have been subject to loss of connectivity, regaining of a network connection. Data of session records area 2122 can include in addition augmented data in the form of returned data returned by subjecting chat session data to natural language processing (NLP) for return, e.g. of topic tags associated to chat session data. Return topics can include entity topics, e.g. specifying a topic of a noun such as a person, place, or thing or return topics can include action topics, e.g. specifying an action described in chat session data. Return topic tags can also include return entity topic value tags. Session records area 2122 can also include all security question and answer data associated to a chat session.

According to one embodiment, return topics can include generic return topics, e.g. the topic "city" or can include specific entity topics. For example the text "It was a beautiful Metropolis!" can return for the term "Metropolis" such topic tag as follows: Metropolis/topic=city. However, the text "I love Chicago" can return such topic tags as follows: Chicago/topic=city/value=Chicago. "Chicago" can return the topic tag of "city" with the species topic value (under the hierarchy of "city") of "Chicago."

Data repository 108 in models area 2123 can store, e.g. predictive models that have been iteratively trained using machine learning processes such as supervised machine learning processes. According to one embodiment, enterprise system 110 can run NLP processes to return topic classifiers for text associated to a chat session. According to one embodiment a commercially available NLP service can be employed that is pretrained to return a variety of topics including entity topics and action topics, but which allows further training in respect to certain entity topics and/or action topics by an administrator user using administrator client computer device 125. Models area 2123 can include custom configured predictive models trained using training sets that are provided by data of enterprise system 110.

Data repository 108 in decision data structures area 2124 can include, e.g. action decision tables which define firing conditions that fire when certain conditions are observed. Various decision data structures can be used for return of action decisions. For example, decision trees can be employed in addition to or in place of action decisions for return of data decisions.

Enterprise system 110 can run machine learning process 111. Enterprise system 110 running machine learning process 111 can include enterprise system 110 training predictive models with training data sets provided by enterprise system 110 which may be designated by an administrator user using administrator client computer device 125.

NLP processing provided by enterprise system 110 according to one embodiment can include use of NLP services that permit customization of NLP processes so that returned tags on datasets provided by running of NLP processes can be customized to the interests of an enterprise operating enterprise system 110.

Enterprise system 110 running chat hosting process 112 can run one or more communication protocol to facilitate a chat session between participants. A chat session can be text based, in which original entries of data by a user participant can be entered in text, or can be voice based, wherein participants communicate in voice. Where a chat session is voice based enterprise system 110 can run speech to text process that converts input speech into text.

Thereafter, input speech can be processed as text using text based NLP processes for example. According to one example, enterprise system 110 can run IBM® Watson® Speech to Text conversion services (IBM® and Watson® are registered trademarks of International Business Machine Corporation). For supporting a text-based chat session, enterprise system 110 can operate in accordance with internet relay chat protocol (IRCP) aspects of which are described in request for comments (RFC) 1459 updated by the following RFCs: 2810, 2811, 2812, 2813, and 7194. For support of a voice based chat session, enterprise system 110 can operate for example, according to the real time transport protocol (RTP) which is a network protocol for delivering audio and video over IP networks. Aspects of the RTP protocol are described in RFC 1889 and 3550.

Enterprise system 110 running NLP process 113 can process data for preparation of records that are stored in data repository 108 and for other purposes. Enterprise system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 enterprise system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Enterprise system 110 can return generic entity topic tags, species instance entity topic tags and action topic tags.

Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Enterprise system 110 running NLP process 113 can include enterprise system 110 returning NLP output parameters in addition to those specification topic and sentiment, e.g. can provide sentence segmentation tags, and part if speech tags. Enterprise system 110 can use sentence segmentation parameters to determine that the action topic and an entity topic are referenced in a common sentence for example.

Enterprise system 110 running session record augmentation process 114 can augment a session record to include data e.g. in the form of returned metadata tags summarizing attributes of a chat session. The summarized attributes can include topics discussed during a chat session. Tags recorded in a chat session record can include, e.g. topic tags and sentiment tags. With a chat session record defined for a chat session, enterprise system 110 can be configured so that when a chat session has been initiated enterprise system 110 stores text content of a chat session into data repository 108, e.g. into session records area 2122.

Enterprise system 110 running session record augmentation process 114 can in response to establishing a network connection subsequent to a loss of connectivity, activate session record augmentation process 114 to generate the described augmented session record summarizing attributes of a chat session based on accumulated text data accumulated prior to a loss of connectivity.

Enterprise system 110 running prompt generating process 115 can generate prompts for purposes of authenticating a user.

Enterprise system 110 running prompt generating process 115 can include enterprise system 110 examining session records of data repository 108 augmented as a result of running session record augmentation process 114. Enterprise system 110 running prompt generating process 115 can include enterprise system 110 generating prompts in the form of security questions. Security questions generated by enterprise system 110 can take on various forms and can have various levels of difficulty. According to one embodiment, security questions can be in dependence on return topics of a chat session prior to loss of connectivity, the return topics returned by running of session record augmentation process 114. Security questions generated by enterprise system 110 by running of prompt generating process 115 can include, e.g. yes/no questions where a user is challenged to answer a security question with a yes/no response. Enterprise system 110 can in addition or alternatively, generate a prompting security question prompting a response in the form of a multiple choice question or an open-ended question.

Enterprise system 110 running prompt generating process 115 can include enterprise system 110 generating correct responses associated to prompts provided by security questions. Accordingly, enterprise system 110 can be configured to examine responses in reference to the generated correct responses to determine whether a user's response to a prompt was correct or incorrect.

Enterprise system 110 running action decision process 116 can return security action decisions. Security action decision can be action decisions in support of authenticating a user or in support of declining authentication to a user. Enterprise system 110 running action decision process 116 can return actions in dependence on a user's response to a presented prompt, presented to a user by running of prompt generating process 115.

Enterprise system 110 running action decision process 116 can include enterprise system 110 returning an action decision to transfer a user to a next security stage. A next security stage can include for example, a stage in which the user is presented with another security question in dependence on a session record, or for example, a stage in which a user is requested to reenter the original security credential information, or to a security stage in which a user is connected to a live administrator user during a chat session (i.e. a VA participant of an enterprise can be replaced by a human administrator user of the enterprise). Enterprise system 110 running action decision process 116 can include enterprise system 110 using one or more decision data structure of decision data structures area 2124, e.g. an action decision table and/or a decision tree.

Figure 2A:
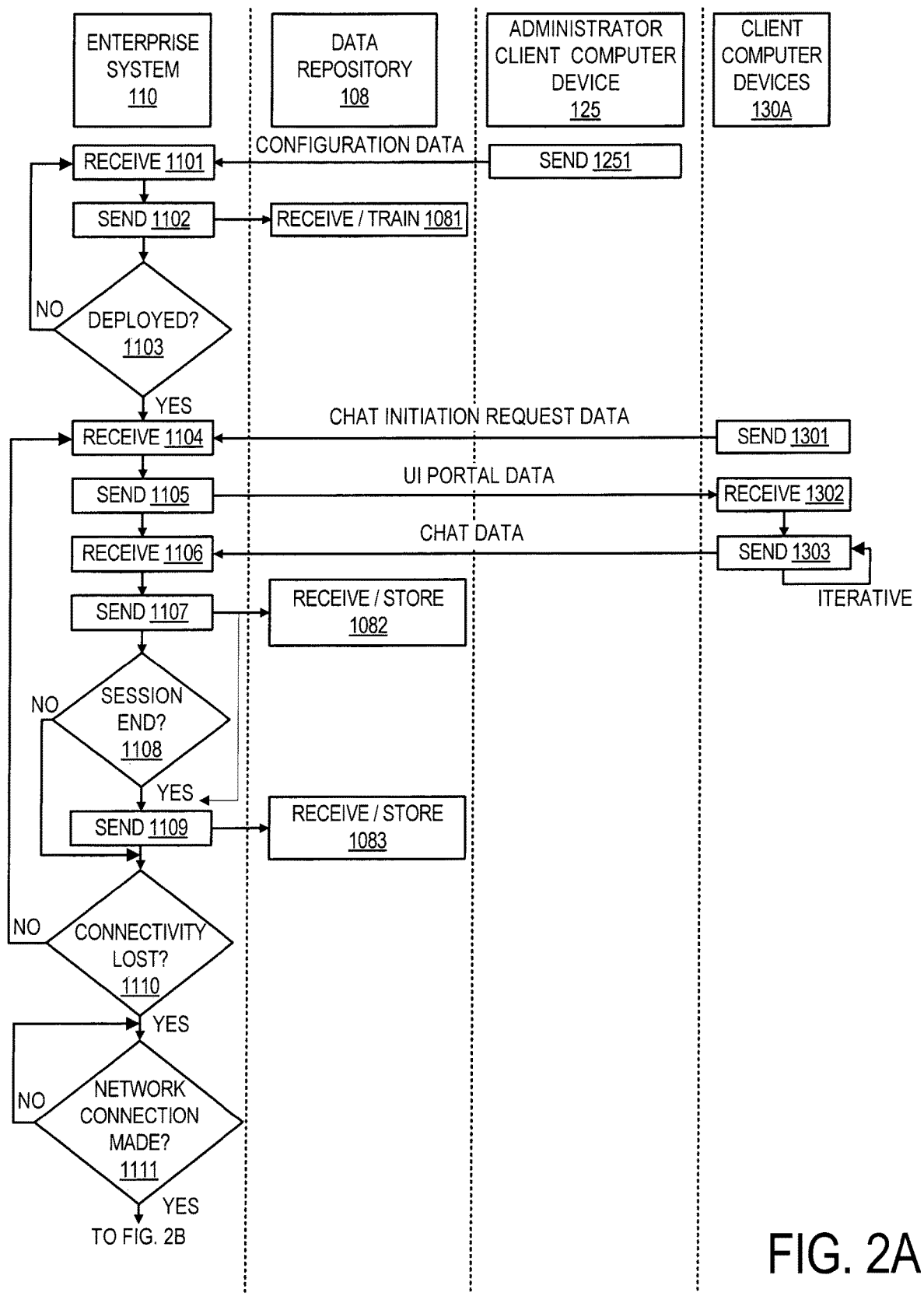
FIG. 2A-2B is a flowchart illustrating a method for performance by enterprise system 110 interoperating with other components according to one embodiment.
Figure 2B:
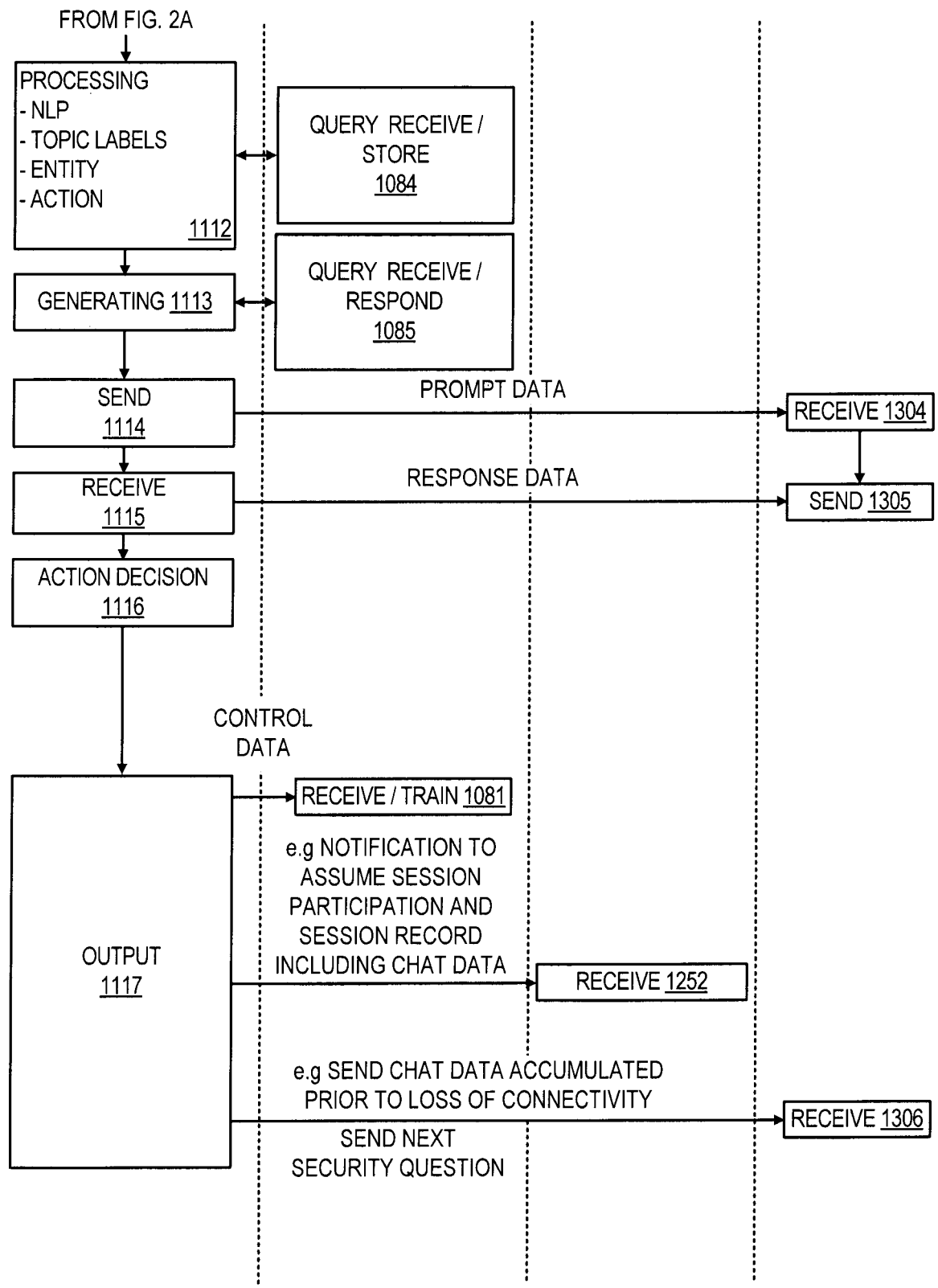

A method for performance by enterprise system 110 interoperating with administrator client computer devices 125 and a client computer device 130A of client computer devices 130A-130Z is set forth in reference to the flowchart of FIGS. 2A-2B. At block 1251, administrator client computer device 125 can be sending administrator user defined configuration data for receipt by enterprise system 110 at block 1101. According to one embodiment, an administrator user can be using an administrator user interface 3000 as set forth in FIG. 3 for defining configuration data for use in configuring enterprise system 110 to support a chat session, e.g. a patron support chat session.

Figure 3:
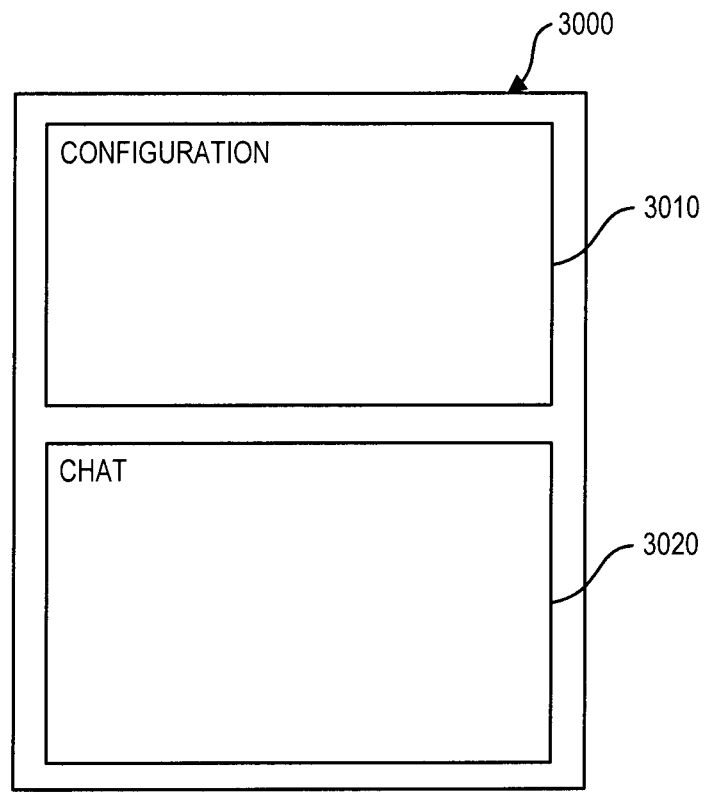
FIG. 3 depicts a displayed user interface for display on a display of an administrator client computer device.
Figure 4:
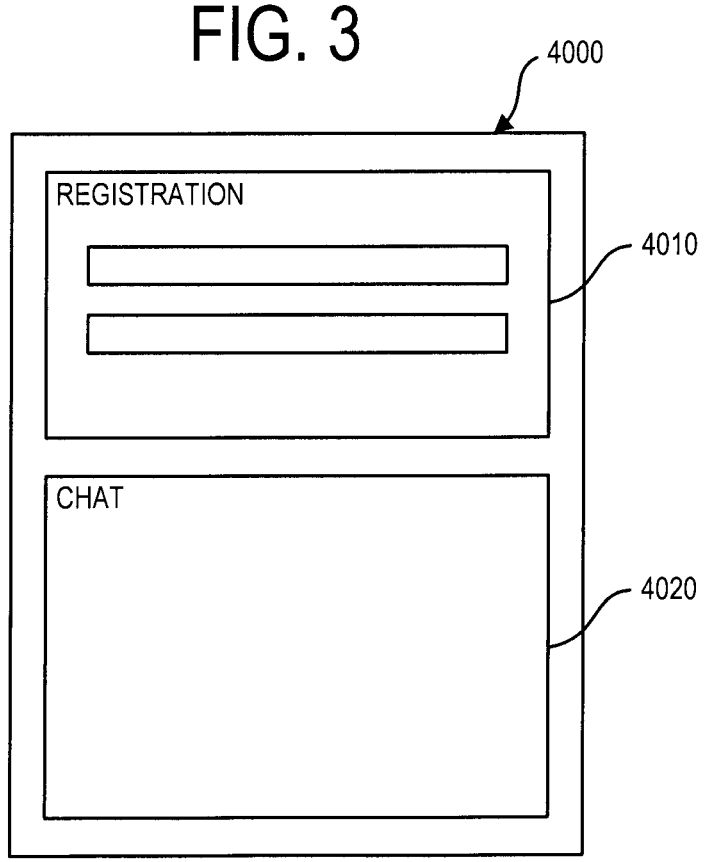
FIG. 4 depicts a user interface for display on the display of client computer device, according to one embodiment.

Referring to FIG. 3, administrator user interface 3000 can include configuration area 3010 in which an administrator user can enter configuration data for use in configuring enterprise system 110. Administrator user interface 3000 can include chat area 3020 in which text based chat data can be displayed. The text based chat data displayed in area 3020 can include originally entered text entered by participants of a chat, e.g. a first participant user who can be a human user and a second participant user who can be a participant of the enterprise operating enterprise system 110, e.g. a VA and/or an administrator user. User interface 4000 of FIG. 4 depicts a user interface for display on a display of client computer devices 130A-130Z.

User interface 4000 can include area 4010 for entering user registration data, e.g. for use in logging on to a chat session and chat area 4020 for displaying text based data of a chat session. Chat area 3020 and chat area 4020 of the user interfaces of FIGS. 3 and 4 respectively can specify text based chat data of a text based chat session or can include text based chat data of a voice based chat session, i.e. text data that has been converted from original voice data.

Configuration data defined by an administrator user and sent at block 1251 can include training data for training predictive models. NLP process 113 (FIG. 1) can be supported by a third party NLP services that provide an ability to automatically return a wide variety of standard offering topics. According to one embodiment, a selected NLP service can be configured to permit enterprise training regarding specialized topics relating to a specific set of services provided by an enterprise operating enterprise system 110.

Figure 5:
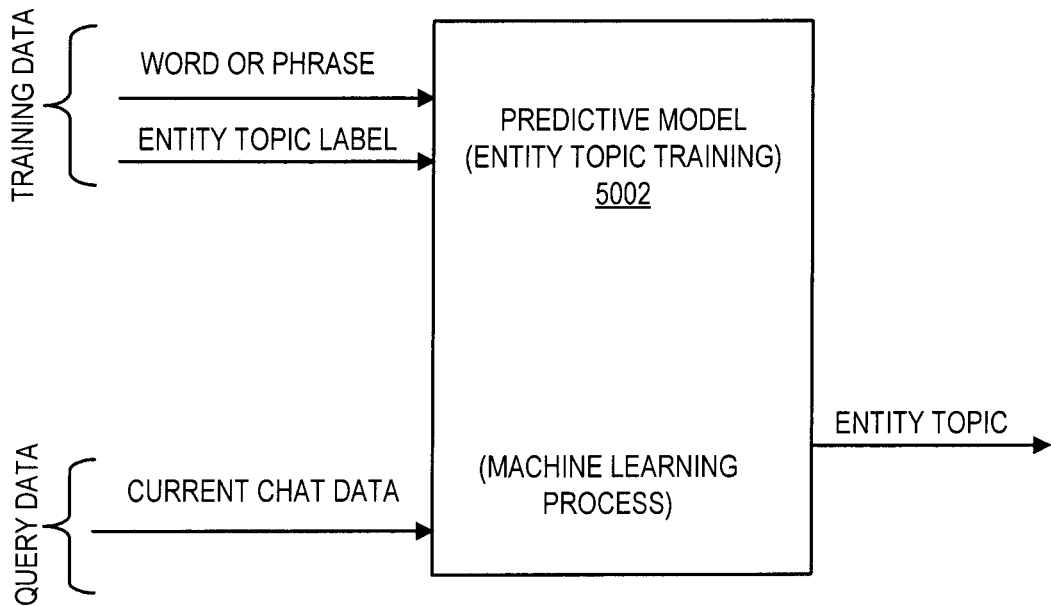
FIG. 5 depicts a predictive model trained by supervised machine learning processes, according to one embodiment.

Predictive model 5002 shown in FIG. 5 is a predictive model that can be trained by way of supervised machine learning training to return entity topics from a set of text such as a set of text defining a chat session. Entity topics herein can be topics that specify a noun, e.g. a person, place, or thing. Predictive model 5002 can be trained with use of iteratively applied training data. A set of training data can include words or phrases combined with a known entity topic label associated to the associated word or phrases. For example, to train predictive model 5002 to return the topics "mobile phone", iteratively applied training datasets can include the known topic label "mobile phone" with a differentiated word or phrase associated with each dataset. For example, a first training dataset can include the known topic label "mobile phone" and the word "smartphone", the second training dataset can include the known topic label "mobile phone" and the word "phone", the third training dataset can include the known topic label "mobile phone" and the phrase "mobile device", and so on. Predictive model 5002 can be trained by machine learning to return topics and species instances of topics which can be referred to herein as topic values. For example, the topic "dog" can have the valid species values of "basset hound", "husky", and "Rottweiler". Predictive model 5002 can be trained to return species instance values of topics by applying appropriate labels to a word or phrase of a training dataset. For example, in the described scenario of training data for training predictive model 5002 to recognize the topic "mobile phone" a training dataset can include the known topic label "mobile phone" and a word associated to a training dataset can include a label specifying that the word is a species instance associated with the topic when that is the case. A training dataset can include, in the described example, the following dataset: topic=mobile phone and word=ACMEPHONE/ (species instance value). By specifying within training datasets that a word or phrase associated to a topic is a species instance value, predictive model 5002 can return topic labels that include both generic topic labels and species instance value topic labels. Predictive model 5002, once trained by supervised machine learning processes is able to respond to query data.

Query data can include for example, text data of a current chat session. In response to applying text data of a current chat session, predictive model 5002 as shown in FIG. 5 can provide a response in the form of an entity topic tag associated to the chat session. One or more entity topic tags can be returned with use of predictive model 5002. Entity topic tags can include general entity topic tags and specific instance topic tags as set forth herein that specify specific instance values associated to a return topic where a specific instance value has been recognized. Where text associated to a current chat session includes words such as "I lost my mobile device" a return topic tag can include, for example: mobile device/topic=mobile phone. Where text of a current chat session includes words such as "I lost my ACMEPHONE" return topic tags can include such tags as: ACMEPHONE/topic=mobile phone/value=ACMEPHONE so that the topics tags associated to ACMEPHONE include the general topic tag "mobile phone" and the species instance value topic tag ACMEPHONE tagged as a species instance value topic under the hierarchy of the general topic "mobile phone".

Figure 6:
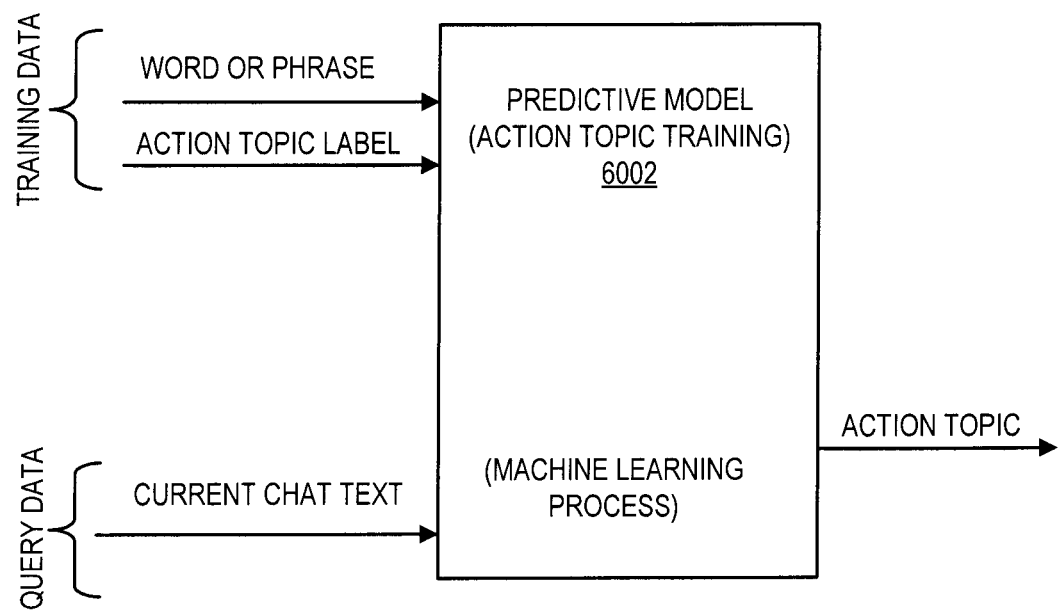
FIG. 6 depicts a predictive model trained by supervised machine learning processes, according to one embodiment.

Predictive model 6002 as shown in FIG. 6 can be a predictive model trained to return action topics associated to data of a chat session. According to one embodiment, an action topic can specify a goal or purpose of a patron's request to an enterprise. In the case of a brick and mortar retail store or even a virtual retail store one common action topic can be "hours of operation" wherein a patron requests a participant of an enterprise to specify the hours in which an enterprise is open. Another common action topic can be, for example, in the case of hospitality services "booking a reservation". Another common action topic can be, "reporting a problem" with a product.

Referring to predictive model 6002 of FIG. 6, predictive model 6002 can be trained by way of supervised machine learning training with use of iteratively applied training data. Iteratively applied training data can include iteratively applied training datasets. Each iteratively applied training dataset can include an action topic label associated to a word or phrase. Training words and phrases used for training predictive models 5002 and 6002 can be selected by an administrator user using administrator user interface 3000 and can be selected based on actual return chat session data collected over time by enterprise system 110 and stored into data repository 108. A training dataset for training predictive model 6002 can include an action topic label associated to a word or phrase. For example, a first training dataset can include the action topic label="reporting problem with product": phrase="my phone crashed". A next iteratively applied training dataset can include as follows: action topic label="reporting problem with product": phrase="my smartphone isn't working". The ability of predictive model 6002 to recognize and return action topics can improve as more training datasets are applied for a given action topic. Predictive model 6002, once trained with use of iteratively applied training data is able to response to query data.

Query data can include text data of a current chat session. In response to applied query data in the form of text data of a current chat session, predictive model 6002 can return as a tag associated to the chat session, one or more action topic, e.g. an action topic such as reporting a problem with a product, what are the hours of operation, booking a reservation, and the like. It will be seen that enterprise system 110 running NLP process 113 can return for a given sentence of text, for example, an action topic and an entity topic. Thus, tags can be returned that specify with data tags a requested action of a patron, a person, place, or thing associated to the action.

Various available tools, libraries, and/or services can be utilized for implementation of predictive model 5002 and predictive model 6002. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Enabled REST APIs can provide e.g. retrieval of metadata for a given predictive model, deployment of models and management of deployed models, online deployment, scoring, batch deployment, stream deployment, monitoring and retraining deployed models. Training predictive model 5002 and/or predictive model 6002 can include use of e.g. support vector machines (SVM), Bayesian networks, neural networks and/or other machine learning technologies.

Referring again to the flowchart of FIGS. 2A-2B, enterprise system 110 on receipt of configuration data at block 1101 can proceed to block 1102. At block 1102 enterprise system 110 in the case that predictive model training data as received at block 1101 can send training data to data repository 108 for receipt by data repository 108 at block 1081 for use in training a specified predictive model stored in models area 2123.

At block 1103, enterprise system 110 can determine whether enterprise system 110 has been deployed for operation to support receipt in responding to patron requests. An administrator user can specify deployment of enterprise system 110 using configuration area 3010 of displayed user interface 3000 displayed on a displayed of administrator client computer device 125. In the case enterprise system 110 is not deployed, enterprise system 110 can return to block 1101 and can proceed to perform the loops of blocks 1101, 1102, and 1103 until enterprise system 110 is deployed. In which case, enterprise system 110 can proceed to block 1104.

At block 1104, enterprise system 110 can receive chat initiation request data from a client computer device. Client computer device 130A can be sending chat initiation request data at block 1301 for receipt by enterprise system 110 at block 1104. A user of client computer device 130A can be defining chat initiation request data using registration area 4010 of user interface 4000 as shown in FIG. 4. In registration area 4010 of user interface 4000, a user can be entering prompted for authentication data such as username data, password data, and security question data. Prompted for authentication data can be prompted for by enterprise system 110 and prompts can be expressed as text displayed in area 4020 of user interface 4000. Accordingly, chat initiation request data sent at block 1301 can include authentication data for use by enterprise system 110 and initially authenticating a user.

On receipt of chat initiation request data at block 1104, enterprise system 110 can authenticate a user and where a user is authenticated can initiate a chat session with the user. On initiation of a chat session on completion of block 1104, enterprise system 110 can proceed to block 1105.

At block 1105, enterprise system 110 can send user interface (UI) portal data for receipt by client computer device 130A at block 1302. On receipt of UI portal data at block 1302, chat area 4020 of user interface 4000 as depicted in FIG. 4, can be active to display chat data of a current chat session that has been initiated by enterprise system 110. In response to receipt of UI portal data at block 1302, client computer device 130A with chat area 4020 activated, can proceed to block 1403. In the case that a current chat session is a text based chat session, chat area 4020 can display text that is identical to the entered text of participants of a chat session. In the case that a current chat session is a voice based chat session, chat area 4020 can display chat session text data that is returned by activation of a speech-to-text conversion process as set forth herein.

At block 1303, with chat area 4020 activated, client computer device 130A can be iteratively sending chat data for receipt by enterprise system 110 at block 1107. Receive block 1106, enterprise system 110, in the case that originally saved chat data is voice based chat data can activate the speech-to-text conversion process to convert the received voice based chat data into text. At block 1107 enterprise system 110 can send text data of a chat to data repository 108 for receipt by data repository 108 at block 1082.

In response to the received text data of a chat session, data repository 108 can store the received text into session records area 2122 of data repository 108. By the sending and storing of text data of a chat, blocks 1107 and 1082, data repository 108 in session records area 2122 can always store an up-to-date record as to the original content of a chat session, e.g. original text data expressed as text or original voice data converted into text.

At block 1108, enterprise system 110 can determine whether a current chat session has been voluntarily ended. If yes, enterprise system 110 at block 1109 can send a record of the chat session for storage into data repository 108 for receipt and storage by data repository 108 at block 1083. The record can include text based data representing all original content of a chat session and/or can include returned tags returned by processing, e.g. NLP processing by activation of NLP process 113. In the case that a current chat session has not been voluntarily ended, enterprise system 110 at block 1108 can proceed to block 1110 to determine whether network connectivity supporting a current chat session has been lost.

At block 1110 enterprise system 110 can determine whether network connectivity supporting a current chat session has been lost. Network connectivity can be lost for a variety of reasons. For example, client computer device 130A may have traveled to a location where it is out of range, network conditions may have changed, e.g. by way of increased loading demand on enterprise system 110, a weather event may have occurred effecting transmission of radio signals, or for any other reason. In the case that enterprise system 110 determines at block 1110 that network connectivity has not been lost, enterprise system 110 can return to block 1104 and can perform the loop of blocks 1104-1110 iteratively until the session has been voluntarily ended (block 1108) or network connectivity has been lost (block 1110). In response to a determination at block 1110 that network connectivity has been lost, enterprise system 110 can proceed to block 1111.

At block 1111, enterprise system 110 can determine whether a network connection has been made to support the current chat session subsequent to a loss of network connectivity. Client computer devices 130A can be configured so that when network connectivity to a host supporting a chat session has been lost, client computer device 130A iteratively retries to connect to the host using the previously recorded IP address of the hose during a preceding chat session now disconnected. With UI portal data sent by enterprise system 110 to client computer device 130A at block 1105, there can be sent installation package data for receipt in client computer device 130A that facilitates client computer device 130A participating in a chat session. The installation package can include, e.g. libraries and executable code that support chat session functionalities. Among such functionalities can include functionalities that cause client computer device 130A to iteratively attempt to reconnect to a host supporting a chat session in the event network connectivity is lost. Such an installation package can be installed on client computer device 130A prior to block 1302.

In response to enterprise system 110 determining at block 1111 that a network connection is made, enterprise system 110 can proceed to block 1112. In the case enterprise system 110 at block 1111 determines that a network connection is not made, enterprise system 110 can iteratively perform block 1111 until a timeout condition occurs. According to one embodiment on the occurrence of a timeout condition, enterprise system 110 can proceed to block 1109 to send a session record to data repository 108 for receipt and storage by data repository 108 at block 1083. The session record can include, e.g. text content specifying the entire content of a chat session and/or can include data tags such as topic tags and/or sentiment tags that specify attributes of a chat session.

At block 1112, in response to detection that a network connection has been made at block 1111, enterprise system 110 can perform processing. Processing at block 1112 can include processing of chat data of the chat session subject to lost connectivity (determined at block 1110). As noted, the up-to-date content of a chat session can be iteratively stored at block 1082. Processing by enterprise system 110 at block 1112 can include processing of text data specifying the updated content of a chat session for return of a chat session record. A chat session record can include test that specifies the original content of a chat session as well as data tags returned by subjecting the text data to processing such as by activation of NLP process 113 for return of NLP parameters.

Enterprise system 110 performing processing at block 1112 can include enterprise system 110 performing processing on original, complete content of a chat session expressed in text up until the point of network connectivity loss using NLP processing by activation of NLP process 113. By activation of NLP process 113 various data tags can be returned for associated to chat text content including entity topic tags and action topic tags as set forth herein. Additional data tags can be returned for association to a chat session including, e.g. sentiment tags. Table A presents an example of chat text content (original content or converted from voice) associated to data tags.

TABLE A

| Chat Content | Topic Tags |
| --- | --- |
| VA: Hello Peter, Good Morning! | Topic = Greeting (Action) Sentiment = 0.7 |
| User: I'm getting frustrated with my new ACMEPHONE 4G phone without knowing how to configure. | Topic = Reporting problem with a product (action) Topic = Mobile Phone (entity) Topic = ACMEPHONE (topic value for topic = mobile phone) Topic = 4G (topic value for topic = mobile phone) Sentiment = negative 0.8 |
| VA: I am very sorry to hear that. Tell me more about the problem. | Topic = Listening (action) |
| User: Sure, I was in Chicago and I got drenched in a sudden downpour. Let me open my device . . . . . . [CONNECTION LOST] | Topic = weather (entity) Topic = rain (value for weather) |

Referring to Table A, processing of chat session text content can return various topic tags and in some cases sentiment tags for the chat text content "Hello Peter, Good Morning" the topic tag returned can be an action topic tag for "greeting". Action topic tags herein can specify actions of an enterprise as well as actions of a patron user. Subjecting the text content of "I'm getting frustrated with my new ACMEPHONE 4G phone without knowing how to configure" can return various topics, including the action topic "reporting problem with product" and the entity topic "mobile phone". Various other topic tags can be returned. Namely, topic tags in the form of species instance value topic tags. In the described example there can be returned a species instance value "ACMEPHONE" for the topic "mobile phone". Based on training data that can be applied using a training method set forth in reference to predictive model 5002 shown in FIG. 5, returned topic tags can include the species instance value "4G" which is the species instance value associated to the generic topic "mobile phone". A sentiment can also be returned for the text of the second row specified in Table A. For example, a sentiment data tag can be returned as follows: negative=0.8.

Enterprise system 110 can be configured to return sentiment tags associated to text segments where sentiment values exceed a threshold, e.g. a negative threshold of 0.7 or a positive threshold of 0.65, enterprise system 110 according to some embodiment can use sentiment tags to control further processing. Continuing with the described example of Table A, enterprise system 110 for the text segment "I am very sorry to hear that. Tell me more about the problem" can return the topic tag: topic=listening which can be an action topic tag. Enterprise system 110 for the text segment "sure, I was in Chicago and got drenched in a sudden downpour. Let me open my device . . . " can return the topic tags topic=weather, which can be an entity topic tag and also the topic tag topic=rain (rain/topic=weather/value=rain), which can be a species instance value that specifies the species instance value for the generic topic of topic=weather.

Enterprise system 110 performing processing at block 1112 can include enterprise system 110 activating session record augmentation process 114 (FIG. 1).

On completion of block 1112, enterprise system 110 can proceed to block 1113. At block 1113 enterprise system 110 can activate prompt generating process 115 to generate a prompt for presentment to a user, e.g. a user using client computer device 130A in the described example. Processing by enterprise system 110 at block 1112 can include iterative queries of data of data repository 108 as indicated by query receive and store block 1084 performed by data repository 108.

Similarly, performing of generating at block 1113 by enterprise system 110 can include iterative queries of data repository 108 as indicated by query receive and respond block 1085 performed by data repository 108. Enterprise system 110 performing generating at block 1113 can include enterprise system 110 examining data of a session data record provided by enterprise system 110 at block 1112 having various data tags, wherein the output provided chat session record can include various data tags including topic data tags. Such topic data tags including entity data tags (including generic entity tags and species instance topic tags associated to generic entity tags) and/or action topic tags.

For performing generating of a prompt for presentment to a user at block 1113, enterprise system 110 can generate a prompt in the form of a security question. For generating such a security question, enterprise system 110 at block 1113 can use topic tags of a session record, generated at block 1112. When a user reestablishes network connection to a host, hosting a chat session, enterprise system 110 can send prompt data for display in area 4020 of user interface 4000 (FIG. 4). Prefacing such authentication prompt data can include a friendly greeting e.g. such friendly greeting as, "We see you are trying to reconnect to a chat session, let us help you locate the right chat."

Sample generated security questions that can be generated by enterprise system 110 at block 1113 are summarized in Table B.

TABLE B

| EXAMPLE | GENERATED SECURITY QUESTION | TYPE | Correct Answer/ Incorrect Answer |
| --- | --- | --- | --- |
| 1 | Are you having a problem with your ACMEPHONE mobile phone? | Yes/No | Correct: Yes; Incorrect: No |

TABLE B-continued

| EXAMPLE | GENERATED SECURITY QUESTION | TYPE | Correct Answer/ Incorrect Answer |
|---|---|---|---|
| 2 | Tell us about your problem that you have been having with your ACMEPHONE mobile phone | Open ended | Correct: e.g. any reference to an ACMEPHONE problem Incorrect: e.g. not providing any information about a problem respecting an ACMEPHONE mobile phone |
| 3 | Your chat session related to (A) rain: (B) ACMEPHONE (C) highway traffic (Select all that apply) | Multiple Choice | Correct: A and B Incorrect: any answer referencing C |
| 4 | Are you having a problem with your SUPERPHONE mobile phone? | Open ended; false entity topic | Correct: e.g. "I have an ACMEPHONE" Incorrect: Any answer describing a problem with a SUPERPHONE mobile phone. |
| 5 | Tell us about the problem you have been with your 5G SUPERPHONE mobile phone | Open ended; false entity topic | Correct: e.g. "I don't have a SUPERPHONE 5G" Incorrect: Any answer describing a problem with a SUPERPHONE mobile phone. |
| 6 | Sorry about the rain in Detroit | Open ended; false entity topic | Correct: e.g. "It was Chicago" Incorrect: e.g. any acknowledgement that the user was in Detroit. |
| 7 | Tell us about the problem you have been having with your router | Open ended; false entity topic | Correct: e.g. "My problem is with my phone" Incorrect: e.g. any acknowledgement regarding a problem with a router |
| 8 | So, you were asking us about our hours of operation? | Open ended; false action topic | Correct: e.g. "reported a problem with my phone" Incorrect: e.g. any acknowledgement that the prior chat session content related to asking about hours of operation. |

As indicated by Table B, generated prompt data, which can be prompt data in the form of security question data, can take on a variety of different forms. According to example 1, the generated security question is in the form of a Yes/No question. According to example 2, the generated security question is shown as being in the form of an open ended question. According to example 3, the generated security question is in the form of a multiple choice question.

As indicated in Table B, enterprise system 110 can with the generating of prompt data in the form of security question data generate answer data. The answer data can include correct answer data and incorrect answer data.

Referring to examples 1 and 3 of Table B, generated security questions can be generated in dependence of an identified action topic. For generating a security question according to one embodiment, enterprise system 110 can (a) identify an action topic based on processing of chat session data and select text for defining the security question based on the identified topic. For generating a security question according to one embodiment, enterprise system 110 can in addition or alternatively (b) identify an entity topic (generic or species instance) based on processing of chat session data and select text for defining the security question based on the identified entity topic.

Enterprise system 110 for generating the security question of example 1 can apply the formula of Equation 1 as follows.

$$\text{QuestionString} = [\text{String1}] + [\text{topic species instance value}] + [\text{generic topic}] \quad \text{(Eq. 1)}$$

Where QuestionString is the text based security question, where "String1" is predetermined looked up text looked up based on an identified action topic (reporting a problem in the described example), where "topic species instance value" is an is an identifies species instance topic returned by examining of chat session data (ACMEPHONE in the described example), and the "generic topic" is the generic topic associated to the species instance value (mobile phone in the described example).

Enterprise system 110 for generating the security question of example 1 can apply the formula of Equation 1 as follows.

$$\text{QuestionString} = [\text{String2}] + [\text{topic species instance value}] + [\text{generic topic}] \quad \text{(Eq. 2)}$$

Where QuestionString is the text based security question, where "String2" is predetermined looked up text looked up based on an identified action topic (reporting a problem in the described example), where "topic species instance value" is an is an identifies species instance topic returned by examining of chat session data (ACMEPHONE in the described example), and the "generic topic" is the generic topic associated to the species instance value (mobile phone in the described example).

Enterprise system 110 can generate security questions having different classifications according to e.g. rules specifies in a list, or determined from a decision tree data structure, or randomly generated for example. Referring to Eq. 1 and Eq. 2 enterprise system 110 can identify a text string (String1 or String2) for building a security question using table lookup.

For example, referring to Table C, enterprise system 110 for generating a question of question classification A, can use String1 (String1="Are you having a problem with your"), associated the indicated returned action type of reporting a problem, as the text string. For generating a question according to question classification B, enterprise system 110, using the decision data structure of Table C, can return the text string, String2 (String 2="Tell us about the problem you have been having with your") associated to the return action topic reporting a problem.

TABLE C

| Example | Action Topic | Question Classification | Predetermied String |
|---|---|---|---|
| 1 | Reporting a problem with product | A | String 1 = "Are you having a problem with your" |
| 2 | Reporting a problem with product | B | String 2 = "Tell us about the problem you have been having with your" |
| ... | ... | ... | ... |

In the described examples, question classification A, maps to example 1 of Table B, and question classification B maps to example 2 of Table B. It can be seen that enterprise system 110 for generating security question can A) identify a topic tag, returning by subjecting data of a chat session to NLP processing B) look up a pre-determined text string in dependence on the identified topic, which can be an action topic and C) provide, in reference to the pre-determined text string, a specifier of an entity topic associated to the chat session.

In the described example, a chat session record records the action topic of reporting a problem and by processing of a common sentence segment also records data tags specifying the entity topics including species instance value topic tags wherein ACMEPHONE is a species instance value topic for general topic mobile phone. Accordingly, security questions such as in specified example 1 and example 2 can be generated, which reference a text string provided in dependence on an identified action topic and which reference a returned entity topic in the form of a specific instance value entity topic namely ACMEPHONE.

According to some embodiments, enterprise system 110 can generate security questions that reference a false entity topic or in some cases a false action topic. A generated chat session record generated at block 1112 can specify a set of entity topics, returned by processing of chat session text data, using NLP. A false entity topic herein can refer to a topic determined by enterprise system 110 to be topic other than a topic defined by text the chat session subject to processing at block 1112. Embodiments herein recognize that a participant objecting to a false topic can be an indicator that the participant actually participated in a chat session and therefore that the participant is an authentic user.

For providing a false entity topic enterprise system 110 can examine training data used for training of predictive model 5002, as set forth in FIG. 5. Predictive model 5002 can be trained using known species instance values for a generic topic. Enterprise system 110 to identify candidate false entity topics can examine a full data set of training data used for training predictive model 5002. The full set of training data can include a full set of species instance values for a generic topic. Enterprise system 110 to return candidate false entity topics can subtract from the full set of species instance values for a generic topic species instance values determined to be present in the chat session subject to processing at block 1112.

In the described example, predictive model 5002 on being trained to learn different species instance values for the topic mobile phone can be trained using training data specifying e.g. species instances of A) ACMEPHONE B) SUPERPHONE and C) MAGICPHONE all of which are brand names of mobile phones. In the described example, subjecting the pre-connectivity loss chat session to processing at block 1112 returns the set of species instance values for mobile phones as the set: ACMEPHONE. Accordingly, enterprise system 110 can generate (by examination of training data for training predictive model 5002) a list of candidate false entity topic species instance mobile phones, wherein the a list of candidate false entity topic species instance mobile phones includes the following set of mobile phone species instance values: A) SUPERPHONE B) MAGICPHONE.

With reference to examples 4-7 in Table B a false entity topic herein can be a topic determined not to be defined in chat session. Enterprise system 110 to determine that a candidate topic is a false entity topic can examine returned topic returned by subjecting chat data to NLP. If a topic from a candidate set of topics is not on a returned list of topics returned when subjecting chat data to NLP, it can be tagged by enterprise system 110 as a false entity topic. Enterprise system 110 can use a set of topics applied as training data for training predictive model 5002 as a candidate set of topics.

Referring to example 4 of Table B, example 4 is presented as a true/false question, but is classified as an open-ended question because a correct answer, as depicted in the correct answer column of Table B, requires the user to object to the characterization that the user has a SUPERPHONE mobile phone. Embodiments herein recognize that a user objecting to a false entity topic, presented as being associated to a chat session, can provide an indication that the user is an authentic user. Embodiments herein also recognize that a user acknowledging that a chat session actually referenced a topic entity that is a false entity topic can indicate that the user is not an authentic user. With reference to example 3 in Table B, the listed entity topic "highway traffic" is not a returned identified topic of a chat session and is a determined false entity topic. Enterprise system 110 can return a negative action decision e.g. to decline authorization on the receipt of response data from a participant user acknowledging that a false entity topic was actually referenced in a chat session.

Embodiments herein can authenticate a user based on response data, indicating that the user has objected to the characterization that a chat session defines a reference to a false entity topic. Referring to example 5 of Table B, example 5 includes a generated security question, generated by substituting a returned identified entity topic, namely ACMEPHONE, for the false entity topic, 5G SUPERPHONE. In example 6, generated security question is generated by a process that includes substituting a returned identified entity topic of a chat session, namely that entity topic Chicago, for the false entity topic Detroit. In example 7, enterprise system 110 generates a security question by a process that includes substituting the returned identified entity topic of mobile phone with the false entity topic of router. Referring to Table B, enterprise system 110 when generating generated security questions can also generate correct answers and incorrect answers associated to such generated security questions. Enterprise system 110 can then return action decisions in dependence on a user's response to a presented generated security question.

In example 8, enterprise system 110 generates a security question that references a false action topic. The identifies chat session in the described example is "reporting a problem with product" but the security question references an action associated to an action topic other than the identified action topic. The question can be regarded to be open ended, and a correct answer can be an answer objects to the characterization that the chat session prior to loss of connectivity related to an inquiry regarding hours of operation.

Referring again to the flow chart of FIG. 2A-2B, enterprise system 110 in response to completion of block 1113 can proceed to block 1114. At block 1114, enterprise system 110 can send generated prompt data e.g. in the form of security question data, for receipt and presentment by client computer device 130A at block 1304. The generated prompt data can be displayed in chat area 4020 of user interface 4000, displayed on a display of client computer device 130A as set forth in reference to FIG. 4. At block 1305, client computer device 130A can send for receipt by enterprise system 110 at block 1115 response data. The response data, by a user, can be defined by a user using user interface 4000, in specifically chat area of 4020 of user interface 4000. On receipt of the response data at block 1115, enterprise system 110 can proceed to block 1116 to perform an action decision. An action decision can be returned in dependence on the response data, received at block 1115. For return of an action decision at block 1116, enterprise system 110 can use a decision data structure cognitively maps, response of a user to a presented prompt to an action decision. Exemplary decision data structures for use in return of action decisions are set forth herein below in Tables D, E, and F.

TABLE D

| Row | Result | Action Decision |
|---|---|---|
| 1 | Prompt response correct | Authenticate; restore session data to user |
| 2 | Prompt response incorrect | Do not authenticate; terminate Session |
| ... | ... | ... |

TABLE E

| Row | Result | Action Decision |
|---|---|---|
| 1 | Classification A prompt response correct | Authenticate; Restore Session data to user |
| 2 | Classification A prompt response incorrect | Present classification B prompt |
| 3 | Classification B prompt response correct | Authenticate; Restore Session data to user |
| 4 | Classification B prompt response incorrect | Do not authenticate; Terminate session |
| ... | ... | ... |

TABLE F

| Row | Result | Action Decision |
|---|---|---|
| 1 | All 3 prompt responses correct | Authenticate; Restore Session data to User |
| 2 | 2 of 3 prompt responses correct | Re-present initial session security questions |
| 3 | 1 of 3 prompt responses correct; peak negative sentiment of patron user less than or equal to 0.7 | Re-present initial session security questions |
| 4 | 1 of 3 prompt responses correct; peak negative sentiment of patron user greater than 0.7 | Transfer session from VA To human administrator user |
| 5 | 0 of 3 prompt responses correct | Do not authenticate; terminate session |
| ... | ... | ... |

The decision data structure of Table D can be used where a single security question is presented to a user. Referring to Table A, a user can be authenticated if a user answers correctly to a security question to a presented security question and can be declined authentication if a user responds incorrectly.

In response to a user being authenticated, enterprise system 110 can restore access of the user to chat session data accumulated prior to the detection of loss of network connectivity at block 1110. Accordingly, with the user being authenticated, the user can have access to text content of a chat session occurring prior to loss of network connectivity. In all text of a text session can be displayable and displayed in chat area 4020 of FIG. 4 of user interface 4000, including text data of a chat session occurring prior to loss of network connectivity detected at block 1110.

Referring to the decision data structure of Table E, the decision data structure of Table E can be used in the case where a user can be presented a series of security questions, when certain conditions apply. Using the decision data structure of Table E, a user can be authenticated responsively to correctly answering a first security question, but if the user incorrectly responds, the first security question can be presented a second security question. In response to an incorrect response to a first security question, a user can be presented a second question of a different classification relative to the first security question. For example, the second security question can be an open-ended question rather than a Yes/No question, or can be multiple question rather than a Yes/No question. According to one example, the first question can be a question that does not include a reference to a false entity topic but only includes references to identified entity topics. However, the second question, which is presented only if the response to the first question is incorrect can use the false entity topic processing for security method wherein a false entity topic is referenced in a security question.

Referring to Table F, the decision data structure of Table F can be used wherein a series of security questions are presented to a user and a user, subject to further authentication processing, in dependence on the cumulative responses of the user in response to the series of security questions. The security questions presented can be a varying types and instances e.g. can include examples 1, 2, and 3 of Table B, 2, 3, and 4 of Table B, or any combination of three instances of the examples depicted in Table B.

On completion of performing action decision block 1116 to return an action decision, enterprise system 110 can proceed to block 1117. At block 1117, enterprise system 110 can provide one or more output for performance of an action in accordance with the action decision returned at block 1116. Enterprise system 110 providing one or more output at block 1117, can include enterprise system 110, sending control data to data repository 108 for receipt by data repository 108 at block 1086. The control data can be control data to return text data of a chat session prior to loss of network connectivity, detected at block 1110 for presentment and display to a user. As noted, an action decision can include an action decision to authenticate a user, and, as part of a user being re-authenticated, the user can have access to chat session content, including chat session content prior to loss of connectivity detected at block 1110.

Enterprise system 110, providing one or more output at block 1117 can include enterprise system 110 sending data for receipt by administrator client computer device 125 at block 1252. Some action decisions referenced herein e.g. in reference to Tables D-F can include an action decision to transfer control of a current chat session from an enterprise participant provided by a VA to an enterprise participant being provided by a human administrator user, using administrator client computer device 125.

Enterprise system 110 accordingly can send a notification to administrator user indicating that administrator user is assuming a participation role on behalf of the enterprise as to the chat session. The notification additional data can be sent to administrator client computer device 125, including such data as chat session text data, specifying the entire content of the chat session, including text content accumulated prior to loss of connective detected at block 1110 and can include data of the chat session record, generated at block 1112, including all topic tags therein as well as all security question and answer content. Therefore, the administrator user at block 1252 has full information of the chat session including returned topic tags associated thereto and the administrator user is informed of the content of the chat session and is able to present live security questions to the user based on the chat session data received.

Enterprise system 110 further to provide one or more output at block 1117 can send various data for receipt by client computer device 130A at block 1306. For example, enterprise system 110 at block 1117 can send to client computer device 130A chat data that has been stored in data repository 108 and which has been accumulated in data repository 108 prior to loss of connectivity detected at block 1110. The sending of such chat data at block 1117 can result in text data defining the content of a chat session being displayed on a display of client computer device 130A e.g. in chat area 4020 of displayed user interface 4000. Data sent from enterprise system 110 to client computer device 130A for receipt at block 1306 can, in some instances, include data specifying a next security question in the case that a security process is being run which may result in more than one e.g. a series of security questions being presented to a user in dependence on a result of a returned action decisions returned at block 1116.

Artificial intelligent systems are evolving in the industry to solve a variety of problems and one such is virtual assistants (VAs) simulating humans at the other end. VAs deployed in the field (for assisting end users in installation or trouble shooting) are able to provide assistance to end users. Security around VA is important. When a chat is initially initiated it's important to authenticate the users if the chat is in the context of an account. Embodiments herein can be employed to augment performance of a chat session between an enterprise and a use wherein an enterprise is represented by a VA simulating a human representative.

Current security methods will typically rely on a user answering questions and the responses can be validated against the predefined answers configured in the user's profile. Another method is to have the user verify specific information about their account. Embodiments herein relate to re-authentication of a chat session subject to loss of connectivity.

When recovering the crashed chat during recovery embodiments herein reconstruct the original chat and deliver to the user for ensuring continuity. Embodiments herein can add a chat extracted dynamic security which is dependent on chat data accumulated prior to loss of connectivity supporting a chat session.

Embodiments herein can intentionally create topics, questions, and examiner responses from the user for compliance non-compliance and execute relevant actions based on the response. Such actions can be e.g. to authorize or decline authorization of a user, terminate close the chat or transfer the chat to a human for further investigation, etc.

Embodiments herein can deploy an AI based virtual agent to mediate a chat session. In crash based recovery dynamic security can be deployed that is comprised of multiple components that analyses chat text and in the event there was an unplanned interruption, uses data from the chat to formulate security questions and uses these questions as the method of re-authenticating the user to the chat session.

A topic manager can be responsible for identifying topics and sentiment. A topic manger can generate alternative related entities and their values can be stored in a data repository as part of the topic record.

A question manager can use data from the data repository and can generate questions in dependence of an identified topic of a chat session. In addition to the question it can also generates a list of answers, including one or more correct answer and one or more incorrect answer.

A question manager can generate questions in dependence on an identified topic but can vary the topic from the identified topic. A question manager can generate questions in dependence on an identified action topic and an identified entity topic but can reference an action other than an action of the identified action topic and/or can reference an entity topic other than the identified entity topic.

A response manager can manage responses from the user and determining success or failure. A response manager can also be responsible for determining the type and number and how many questions to ask the user based whether the user's their responses to a given question were successful or not. If a response manager determines that the user has provided an incorrect answer it can e.g. (a) call an I/O controller component to close a chat session; (b) decrease security points to the user and transfer authorization processing to a new stage; (c) transfer control of a session to a human agent of an enterprise; and/or (d) recover and/or send a record of a chat session including accumulated text data of the chat to the human agent. If a response manager determines that the user has provided a correct answer it can e.g. (a) authenticate the user (b) increase security points to the user and transfer authorization processing to a new stage; and/or (c) send a record of a chat session including accumulating text data of the chat to the user.

A data repository can store a chat session record than can include a record of chat text data of a chat session, identified entity topics of a chat session, identifies action topics of a chat session, and identified sentiments of a chat session all time stamped to specify the time of participant presentment of tagged content.

Certain embodiments herein may offer various technical computing advantages involving computing advantages to address problems arising in the realm of computer networks. Embodiments herein can include method for authentication of user can be triggered with a loss of network connectivity and subsequent making of a network connection to a host of a chat session. Embodiments herein can improve operation of computer systems and networks including by providing of data security by restricting access to computer systems and networks only to authorized users who can successfully pass a security challenge generated with use of artificial intelligence (AI). Embodiments herein can include processing data of a chat session accumulating prior to a loss of connectivity and based on the processing presenting prompts to a user. The prompts can take the form of security questions defining a security challenge. Authorization action decisions can be returned in dependence on a response of a user. Embodiment herein can improve interactions of a virtual assistant (VA) including providing AI generated questions for presentment by a VA that are realistic and in dependence on identified topics of a chat session. Embodiments herein can record chat session data and can provide session record data to user participants of a chat session and to human agents of an enterprise. The record to a human agent can include augmented data such as user answers to security questions, topic tags and sentiment tags. Various decision data structures can be used to drive artificial intelligence (AI) decision making, such as decision data structure that cognitively maps security questions to security action decisions. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Figure 7:
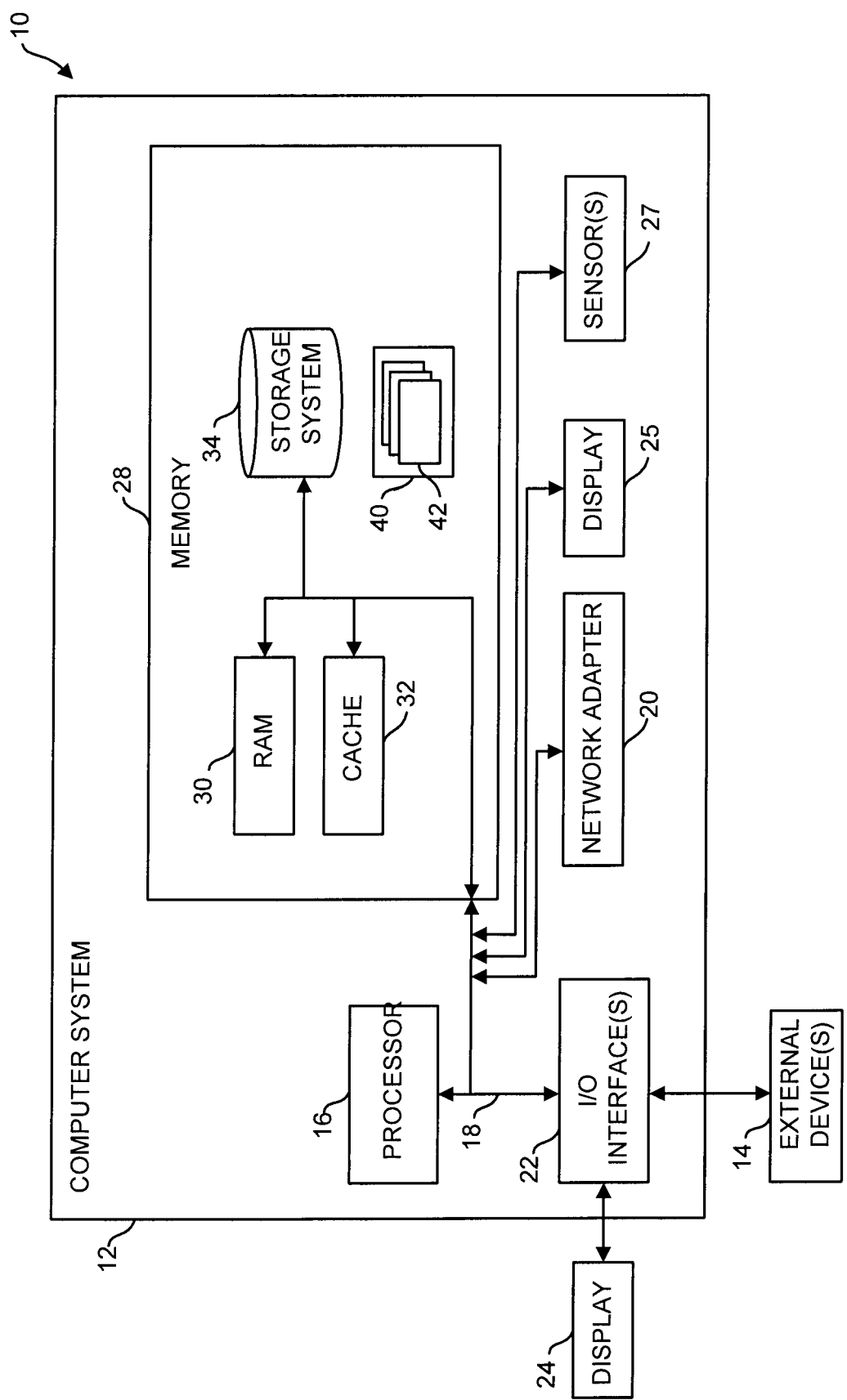
FIG. 7 depicts a computing node according to one embodiment.
Figure 8:
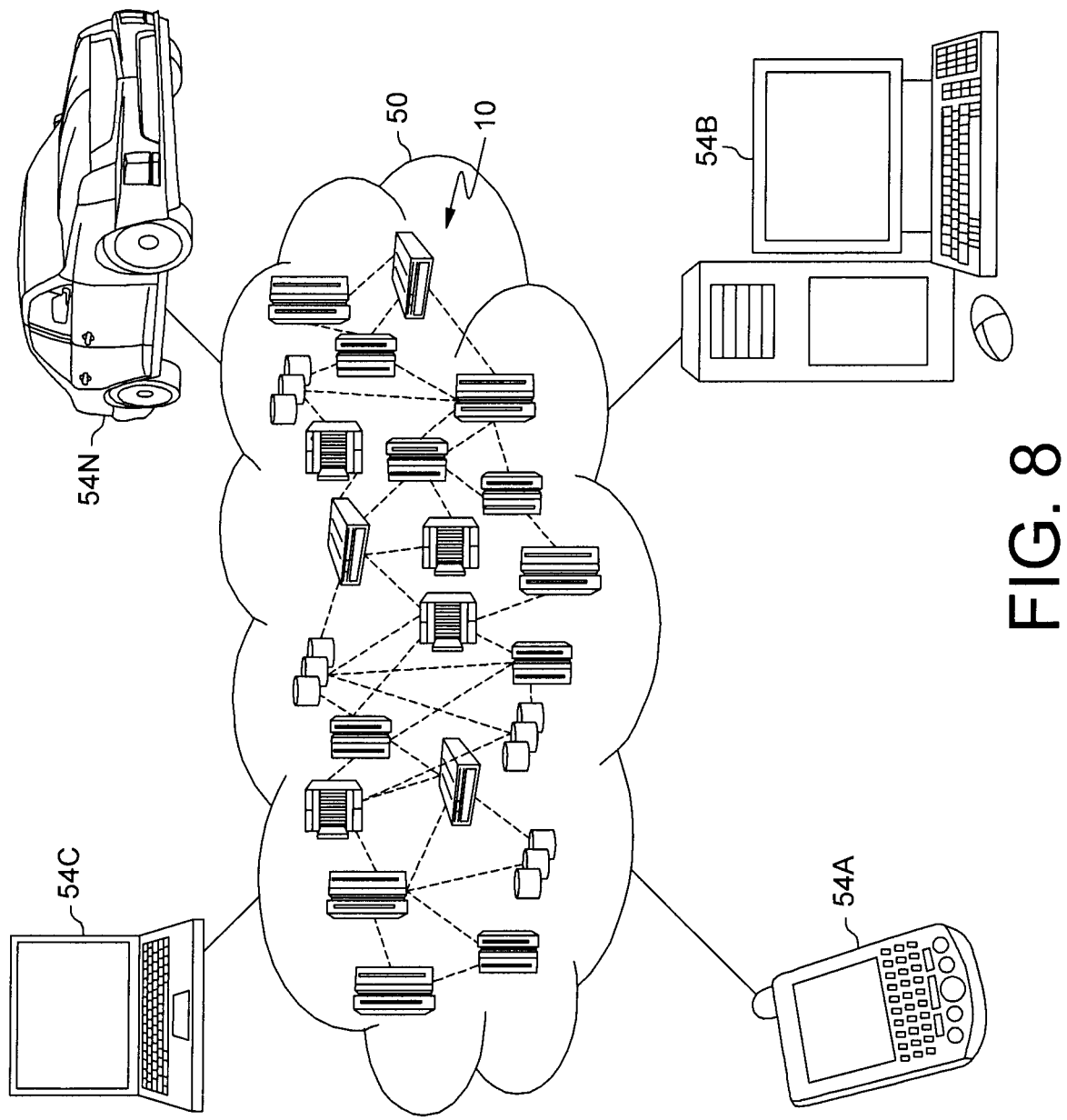
FIG. 8 depicts a cloud computing environment according to one embodiment.
Figure 9:
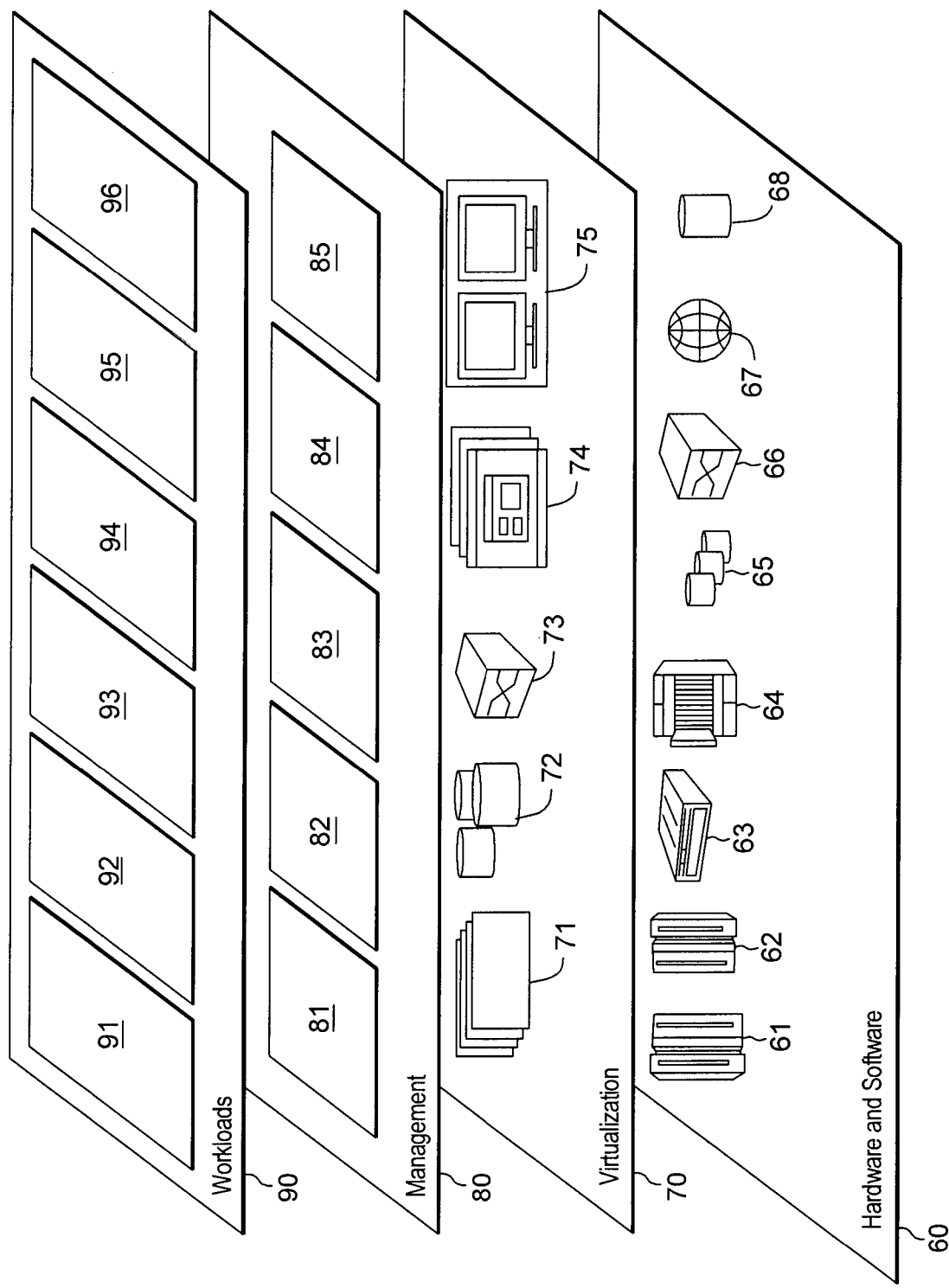
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, enterprise system 110 can include one or more computing node 10 and can include one or more program 40 for performing functions described with reference to enterprise system 110 as set forth in the flowchart of FIGS. 2A-2B. In one embodiment, one or more client computer device 130A can include one or more computing node 10 and can include one or more program 40 for performing functions described with reference to one or more client computer device 130A as set forth in the flowchart of FIGS. 2A-2B. In one embodiment, administrator client computer device 125 can include one or more computing node 10 and can include one or more program 40 for performing functions described with reference to administrator client computer device 125 as set forth in the flowchart of FIGS. 2A-2B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for providing chat session security herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
obtaining chat session data of a chat session having a first participant provided by a patron user and a second participant provided by an enterprise user;
detecting, subsequent to a connectivity failure, that a network connection supporting the chat session has been restored;
presenting in response to the detecting a prompt to the first participant, the prompt being in dependence on the chat session data;
deciding an authentication action in dependence on a received response of the first participant in response to the presented prompt; and
performing the authentication action in accordance with the deciding.

2. The method of claim 1, wherein the method includes examining data of the chat session data to identify one or more topic defined by text based data of the chat session, the text based data accumulating prior to the connectivity failure, and wherein the method includes generating the prompt so that the prompt includes text based content in dependence on the one or more topic identified by the examining.

3. The method of claim 1, wherein the method includes examining data of the chat session data to identify one or more action topic defined by text based data of the chat session accumulating prior to the connectivity failure and one or more entity topic defined by text based data of the chat session accumulating prior to the connectivity failure, and wherein the method includes generating the prompt so that the prompt includes text based content in dependence on the one or more action topic and in dependence on the one or more entity topic.

4. The method of claim 1, wherein the method includes examining the chat session data to determine a list of topics defined by the chat session prior to the connection failure, and wherein the method includes generating the prompt so that the prompt includes references to a first topic and a second topic, wherein the first topic is a topic identified by examination of chat data accumulated prior the connectivity failure, and wherein the second topic is a false topic not identified by examination of chat data accumulated prior to the connectivity failure, wherein the received response of the first participant is an acknowledgment by the first participant that that the chat session prior to the connection failure referenced the second topic.

5. The method of claim 1, wherein the method includes prior to the connectivity failure accumulating text based data of the chat session into a data repository, and wherein the action decision includes a decision to (a) authenticate the first participant and to (b) send the first participant data of the text based data accumulated in the data repository prior to the connectivity failure.

6. The method of claim 1, wherein the method includes prior to the connectivity failure accumulating text based data of the chat session into a data repository, and wherein the action decision includes a decision to (a) send a notification to a human agent of the enterprise notifying the human agent that management of the chat session is being transferred from a virtual assistant as the enterprise user to the human agent as the enterprise user, and (b) send the human agent data of the text based data accumulated in the data repository prior to the connectivity failure, and (c) send the human agent session record data of the chat session that includes returned topic tags of the chat session and security question and answer data of the first participant.

7. The method of claim 1, wherein the method includes examining the chat session data accumulated in a data repository prior the connectivity failure to determine a list of topics defined by the chat session prior to the connectivity failure, wherein the list of topics includes a first species instance entity topic associated to a first generic topic and having a first species instance value, and a first action topic, wherein the presenting in response to the detecting a prompt to the first participant includes presenting a prompt having content that specifies an action according to the first action topic and referencing the first generic topic and a second species instance value associated to the first generic topic, the second species instance value being a false entity topic that is not referenced in the chat session prior to the connectivity failure.

8. The method of claim 1, wherein the method includes examining the chat session data using Natural Language Processing (NLP) to determine a list of topics defined by the chat session prior to the connection failure, wherein the examining the chat session data is performed in response to the detecting, wherein the list of topics includes a first entity topic having first value, and a first action topic associated to the first entity topic, wherein the presenting in response to the detecting a prompt to the first participant includes presenting a security question so that the security question includes text selected based on the determined first action topic and text selected based on the determined first entity topic.

9. The method of claim 1, wherein the method includes examining the chat session data using Natural Language Processing (NLP) to determine a list of topics defined by the chat session prior to the connection failure, wherein the examining includes identifying a false species instance entity topic, the false species instance entity topic being a topic that is not defined by the chat session data, wherein the presenting in response to the detecting a prompt to the first participant includes presenting a security question so that the security question presents text defining the false species instance entity topic, wherein the received response of the first participant in response to the security question includes the first participant objecting to the false species instance entity topic, and wherein authentication action includes authenticating the first participant based on the objecting.

10. The method of claim 1, wherein the method includes examining text based data of the chat session accumulated in a data repository prior to the connectivity failure using Natural Language Processing (NLP) to return a list of topics defined by the chat session prior to the connection failure, wherein the examining includes identifying a false species instance entity topic, the false species instance entity topic being a topic not among the returned list of topics defined by the chat session prior to the connection failure, wherein the presenting in response to the detecting a prompt to the first participant includes presenting a security question so that the security question presents text defining the false species instance entity topic, wherein the received response to the security question includes the first participant objecting to the false species instance entity topic, and wherein authentication action includes authenticating the first participant based on the objecting, wherein the method includes performing the examining text based data in response to the detecting, wherein the chat session is a voice based chat session and wherein the text based data is data converted from voice.

11. The method of claim 1, wherein the method includes examining text based data of the chat session accumulated in a data repository prior to the connectivity failure using Natural Language Processing (NLP) to return a list of topics defined by the chat session prior to the connection failure and one or more sentiment parameter value indicative of an exhibited sentiment of the participant user, wherein the examining includes identifying a false species instance entity topic, the false species instance entity topic being a topic not among the returned list of topics defined by the chat session prior to the connection failure, wherein the presenting in response to the detecting a prompt to the first participant includes presenting a security question so that the security question presents text defining the false species instance entity topic, wherein authentication action is decided in dependence on a corrected of the response and the one or more sentiment parameter indicative of an exhibited sentiment of the first participant, wherein the method includes performing the examining text based data in response to the detecting, wherein the chat session is a voice based chat session and wherein the text based data is data converted from voice.

12. The method of claim 1, wherein the method includes examining text based data of the chat session accumulated in a data repository prior to the connectivity failure using Natural Language Processing (NLP) to return a list of topics defined by the chat session prior to the connection failure, wherein the examining includes identifying a false species instance entity topic, the false species instance entity topic being a topic not among the returned list of topics defined by the chat session prior to the connection failure, wherein the presenting in response to the detecting a prompt to the first participant includes presenting a security question so that the security question presents text defining the false species instance entity topic, wherein the method includes prior to the connectivity failure accumulating text based data of the chat session into a data repository, and wherein the action decision includes a decision to (a) authenticate the first participant and to (b) send the first participant data of the text based data accumulated in the data repository prior to the connectivity failure.

13. The method of claim 1, wherein the method includes examining text based data of the chat session accumulated in a data repository prior to the connectivity failure using Natural Language Processing (NLP) to return a list of topics defined by the chat session prior to the connection failure, wherein the examining includes identifying a false species instance entity topic, the false species instance entity topic being a topic not among the returned list of topics defined by the chat session prior to the connection failure, wherein the presenting in response to the detecting a prompt to the first participant includes presenting a security question so that the security question presents text defining the false species instance entity topic, wherein the method includes prior to the connectivity failure accumulating text based data of the chat session into a data repository, and wherein the action decision includes a decision to (a) send a notification to a human agent of the enterprise notifying the human agent that management of the chat session is being transferred from a virtual assistant as the enterprise user to the human agent as the enterprise user, and (b) send the human agent data of the text based data accumulated in the data repository prior to the connectivity failure, and (c) send the human agent session record data of the chat session that includes returned topic tags of the chat session and security question and answer data of the first participant.

14. The method of claim 1, wherein the method includes examining the chat session data to determine a list of topics defined by the chat session prior to the connection failure, and wherein the method includes generating the prompt so that the prompt is provided by a security question in multiple choice form that references a first topic and a second topic, wherein the first topic is a topic identified by examination of chat data accumulated prior the connectivity failure, and wherein the second topic is a false topic not identified by examination of chat data accumulated prior to the connectivity failure, wherein the received response of the first participant is an acknowledgment by the first participant that that the chat session prior to the connection failure referenced the second topic, and wherein the authentication action is a negative authentication action.

15. The method of claim 1, wherein the method includes examining text based data of the chat session accumulated in a data repository prior to the connectivity failure using Natural Language Processing (NLP) to identify a list of action topics defined by the chat session prior to the connection failure, wherein the examining includes identifying a false action topic, the false action topic being a topic not among the returned list of action topics defined by the chat session prior to the connection failure, wherein the presenting in response to the detecting a prompt to the first participant includes presenting a security question so that the security question present text referencing an action of the false action topic, wherein the method includes prior to the connectivity failure accumulating text based data of the chat session into a data repository, and wherein the authentication action includes action to (a) authenticate the first participant and to (b) send the first participant data of the text based data accumulated in the data repository prior to the connectivity failure.

16. The method of claim 1, wherein the method includes examining data of the chat session data to identify one or more topic defined by text based data of the chat session, the text based data accumulating prior to the connectivity failure, and wherein the method includes generating the prompt so that the prompt includes text based content in dependence on the one or more topic identified by the examining, wherein the authentication action includes an action to authenticate the first participant, wherein the method includes prior to the connectivity failure accumulating text based data of the chat session into a data repository, and wherein the authentication action includes action to (a) authenticate the first participant and to (b) send the first participant data of the text based data accumulated in the data repository prior to the connectivity failure.

17. The method of claim 1, wherein the method includes examining data of the chat session data using NLP processing to identify one or more topic and one or more sentiment value defined by text based data of the chat session, the text based data accumulating prior to the connectivity failure, and wherein the method includes generating the prompt so that the prompt includes text based content in dependence on the one or more topic and one or more sentiment value identified by the examining, wherein the authentication action includes an action to authenticate the first participant, wherein the method includes prior to the connectivity failure accumulating text based data of the chat session into a data repository, and wherein the authentication action includes action to (a) authenticate the first participant and to (b) send the first participant data of the text based data accumulated in the data repository prior to the connectivity failure.

18. The method of claim 1, wherein the method includes examining data of the chat session data using NLP processing to identify one or more topic defined by text based data of the chat session, the text based data accumulating prior to the connectivity failure, and wherein the method includes generating the prompt so that the prompt includes text based content in dependence on the one or more topic identified by the examining, wherein the authentication action includes an action to authenticate the first participant, wherein the method includes prior to the connectivity failure accumulating text based data of the chat session into a data repository, and wherein the authentication action includes action to (a) authenticate the first participant and to (b) send the first participant data of the text based data accumulated in the data repository prior to the connectivity failure, wherein the chat session is a voice based chat session and wherein the text based data is data converted from voice.

19. A computer program product comprising:
  a computer readable storage medium readable by one or more processing circuit and storing instructions for execution by one or more processor for performing a method comprising:
    obtaining chat session data of a chat session having a first participant provided by a patron user and a second participant provided by an enterprise user;
    detecting, subsequent to a connectivity failure, that a network connection supporting the chat session has been restored;
    presenting in response to the detecting a prompt to the first participant, the prompt being in dependence on the chat session data;
    deciding an authentication action in dependence on a received response of the first participant in response to the presented prompt; and
    performing the authentication action in accordance with the deciding.

20. A system comprising:
a memory;
at least one processor in communication with the memory; and
program instructions executable by one or more processor via the memory to perform a method comprising:
  obtaining chat session data of a chat session having a first participant and a second participant;
  detecting, subsequent to a failure of the chat session, that the chat session has been restored;
  presenting in response to the detecting a prompt to the first participant, the prompt being in dependence on the chat session data; and
  deciding an authentication action in dependence on a received response of the first participant in response to the presented prompt.

* * * * *